June 19, 1956 G. B. DOREY 2,750,803
ROTATING MECHANISM FOR A BRAKE SLACK ADJUSTER
Filed Nov. 29, 1954 3 Sheets-Sheet 1
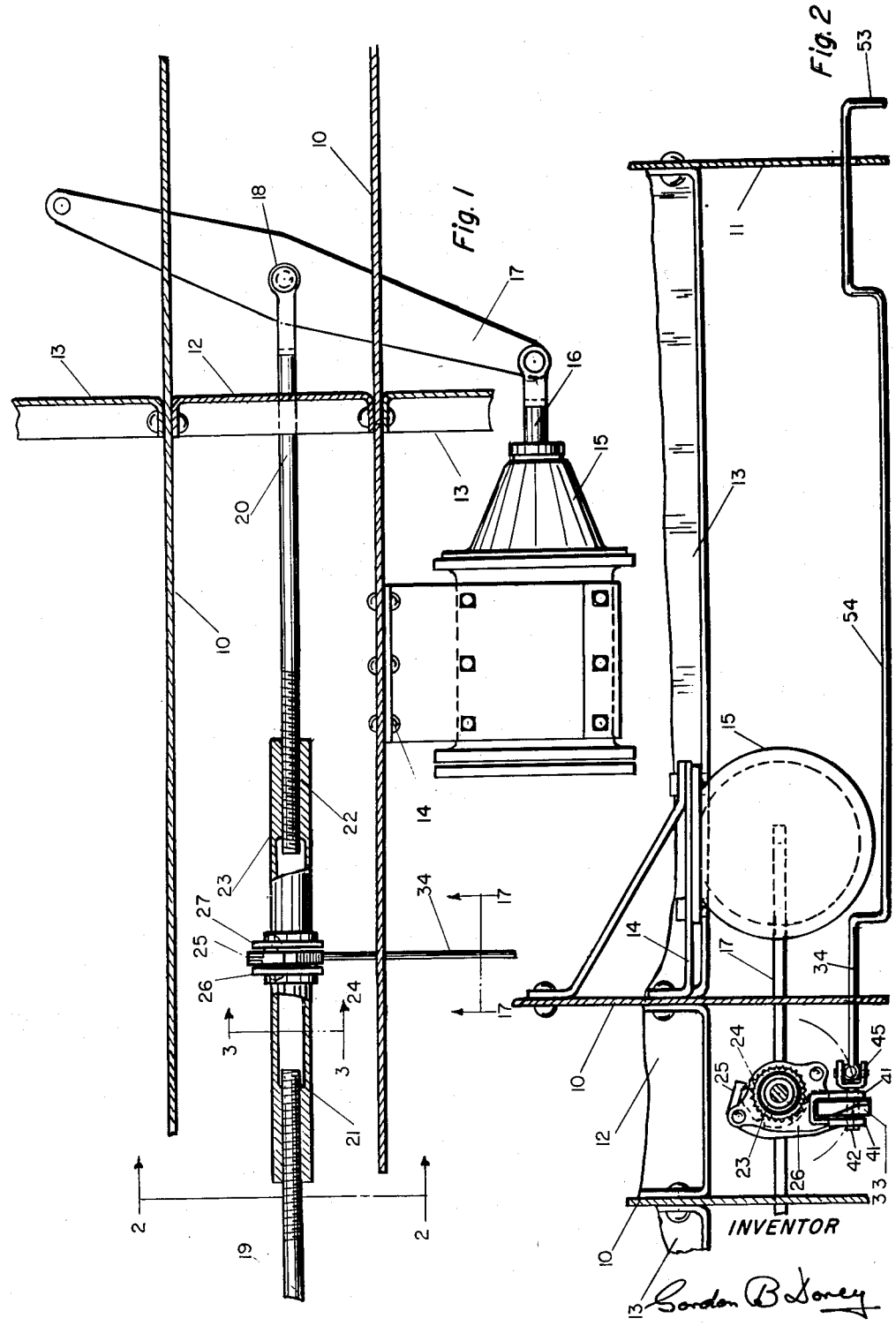
INVENTOR
Gordon B Dorey

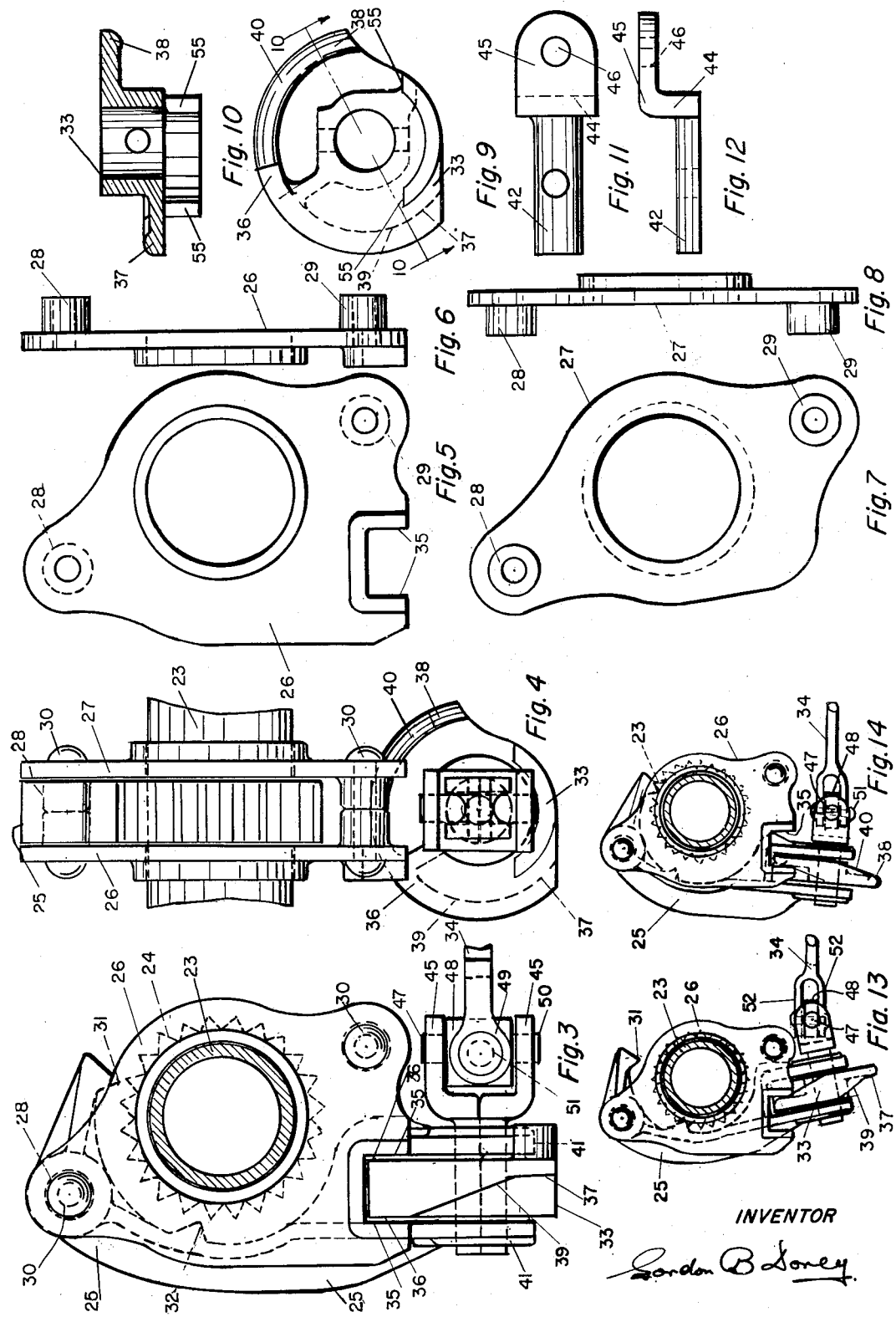

June 19, 1956 G. B. DOREY 2,750,803
ROTATING MECHANISM FOR A BRAKE SLACK ADJUSTER
Filed Nov. 29, 1954 3 Sheets-Sheet 3
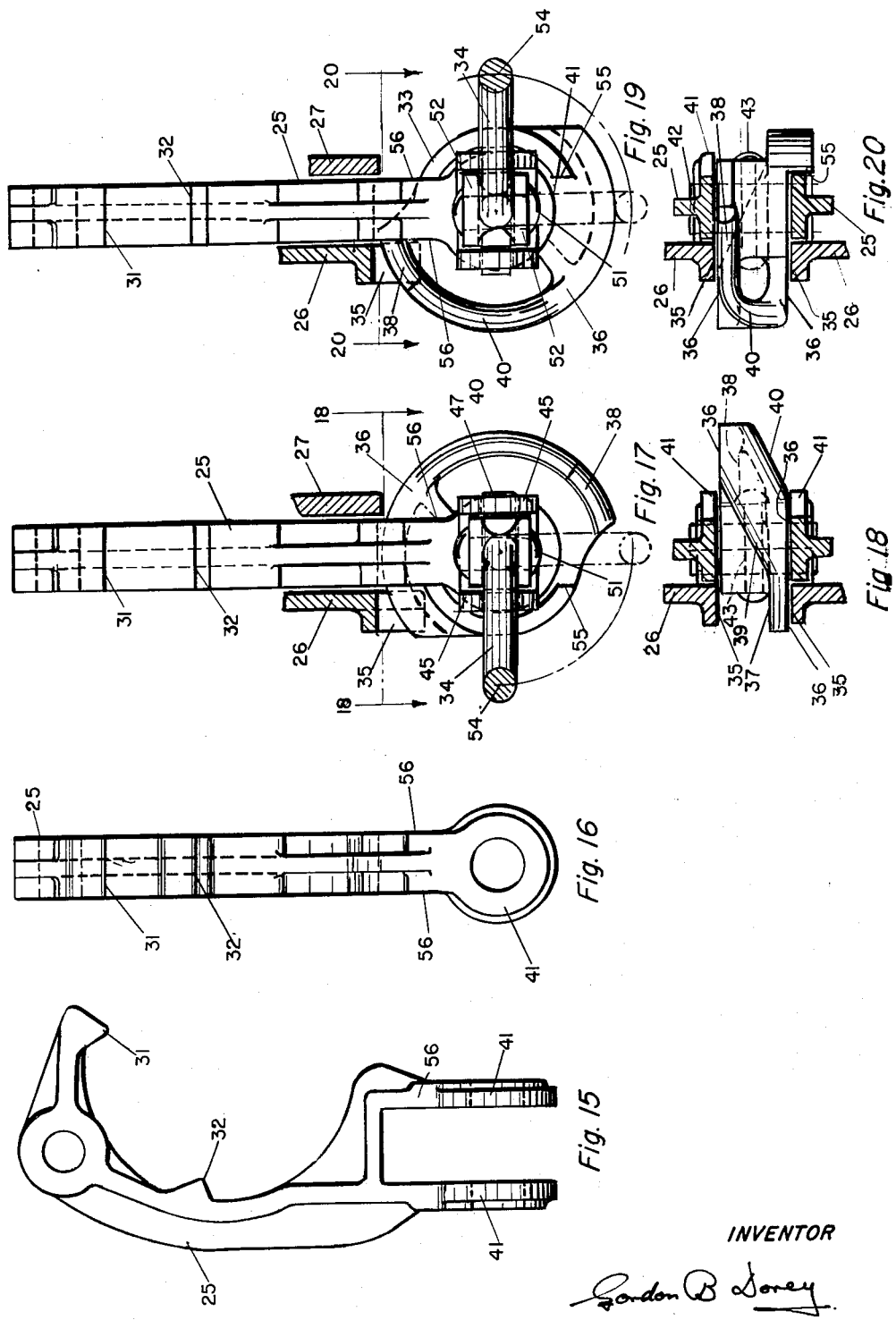
INVENTOR
Gordon B Dorey United States Patent Office 2,750,803
Patented June 19, 1956

2,750,803

ROTATING MECHANISM FOR A BRAKE SLACK ADJUSTER

Gordon B. Dorey, Westmount, Quebec, Canada, assignor to Continental Transport Appliances, Limited, Montreal, Quebec, Canada, a corporation of Canada Application November 29, 1954, Serial No. 471,868

7 Claims. (Cl. 74—157)

The invention relates to a rotating mechanism for a brake slack adjuster and relates more particularly to the type of mechanism operated through the medium of a reciprocating connection.

The objects of the invention among others are to provide a rotatable mechanism for rotating a centrally disposed rotatable screw take-up device from a location remote from the take-up device; to provide a selective rotating mechanism operable by a rotatable and reciprocable connection whereby direction of rotation is effected by a variation in radial position of the connection; to provide a shifter operable by rotation for changing the direction of rotation of a screw take-up device; and to provide a rotating mechanism for operating a screw take-up device in either direction of rotation and which is biased to return to a released neutral position and allow rotation of the take-up device in either direction independently of the rotating mechanism.

The invention further resides in certain details of construction employed in carrying out the invention such as will be described and claimed.

For further comprehension of the invention reference may be had to the accompanying drawings weherein:

Figure 1 is a plan view of a portion of a railway car underframe showing so much of the car as necessary to illustrate a portion of the brake rigging and an embodiment of the invention applied thereto.

Figure 2 is a vertical transverse elevational view taken through the car adjacent the brake rigging as taken at a location designated by lines 2—2 of Fig. 1.

Figure 3 is an enlarged vertical sectional view of the screw take-up device showing the rotating mechanism with the parts in released neutral position, said view being taken on a line corresponding substantially to a line 3—3 of Fig. 1.

Figure 4 is a side elevational view of the mechanism shown in Fig. 3 as viewed from right to left.

Figure 5 is a detached vertical frontal view of one of the levers of the lever assembly, said view showing the lever member having limiting abutments for co-operation with the shifter cam.

Figure 6 is a side elevational view of the lever member shown in Fig. 5 as viewed from right to left.

Figure 7 is a frontal elevational view of the companion lever member which in co-operation with the lever shown in Fig. 5 forms the lever assembly.

Figure 8 is a side elevational view of the lever member shown in Fig. 7 as viewed from right to left.

Figure 9 is a vertical elevational view of the cam shifter.

Figure 10 is a sectional plan view of the shifter shown in Fig. 9 as seen on a line 10—10 of said Fig. 9.

Figure 11 is a plan view of one of the shifter pintle members.

Figure 12 is a vertical side elevational view of the shifter pintle shown in Fig. 11.

Figure 13 is a vertical elevational view of the mechanism with the shifter positioned for effecting anticlockwise rotation as viewed in said figure.

Figure 14 is a view similar to Fig. 13 except that the shifter is now positioned to effect clockwise rotation.

Figure 15 is a detached vertical elevational view of the operating pawl.

Figure 16 is a side elevational view of the pawl shown in Fig. 15 as viewed from right to left.

Figure 17 is a fractional sectional elevational view of the lever assembly and operating connection as viewed on a line 17—17 of Fig. 1, said view showing certain parts broken away to better illustrate the connection.

Figure 18 is a sectional plan view taken on a line 18—18 of Fig. 17.

Figure 19 is a view similar to Fig. 17 except that the shifter is shown as positioned to effect rotation in the opposite direction.

Figure 20 is a sectional plan view taken on a line 20—20 of Fig. 19.

In said drawings 10—10 indicates the center sills of the car, 11 one of the side sills, 12 a spacing member between the sills and 13 a crossbeam member.

A bracket 14 is carried by the center sill and this bracket in turn carries the usual brake operating cylinder 15 having a push rod 16 connected with one of the brake levers 17 of the brake rigging. The lever 17 is interconnected with another lever (not shown) through the medium of a center rod connection 18, the latter being divided lengthwise to present two sections 19 and 20 which are screwthreaded at their inner ends to respectively present right and left hand threads as indicated at 21 and 22 respectively.

Co-operating with the screwthreaded ends 21 and 22 is a complementary screwthreaded take-up device 23 for varying the length of the connection by rotation of the said take-up device.

The mechanism whereby rotation of the take-up device is effected constitutes the subject of the present invention.

In carrying out the invention a ratchet wheel member 24 is welded or otherwise secured to the take-up device and co-operable therewith is a lever assembly including a pawl 25 pivotally mounted on lever members 26 and 27, said last named members being rotatably mounted on the take-up device and respectively disposed on opposite sides of the ratchet wheel 24.

The said members 26 and 27 at their upper end are each provided with aligned trunnions 28—28 which constitute pivotal mountings for the pawl 25. The said trunnions 28—28 operate as spacers for the upper end of the lever members and other spacers 29—29 are provided adjacent the lower part of the said members. Rivets 30 extend through the trunnions 28 and 29 and the lever members 26 and 27 thus function as a unitary structure.

The pawl 25 is provided with oppositely disposed detents as indicated at 31 and 32 respectively for engagement with the teeth of the ratchet wheel and effecting rotation of the screw take-up device in either direction in a manner as will be hereinafter pointed out.

The detents 31 and 32 are normally spaced a sufficient distance from the ratchet wheel as to fully clear the latter and permit rotation of the ratchet wheel in either direction independently of the detents when the pawl is held in released neutral position as indicated in Fig. 3. The pawl is held in neutral position by means of a cam shifter 33 forming part of an operating connection 34 which is rotatably mounted on the pawl member on an axis extending generally in the direction of swinging movement of the lever structure.

The shifter 33 is in the form of a disc cam of variable pitch and its outer portion extends between abutments 35—35, the latter being spaced from each other in the direcion of swinging movement of the pawl to accommodate the greatest depth of the shifter therebetween. The extreme depth of the shifter is indicated by surfaces 36—36 and as will be seen by reference to Figs. 3 and 4 the said surfaces lie adjacent the abutments 35—35 and operate as a lock to maintain the pawl 25 against swinging movement relatively to the lever members 26 and 27 and thus maintains the pawl in released neutral position. In order to effect rotation of the take-up device in either direction the shifter cam is provided with axially spaced surfaces 37 and 38 which are radially spaced in opposite directions from the surfaces 36—36 and connected therewith by means of the sloping surfaces 39 and 40. Rotation of the cam thus provides a screw-like movement which changes the relation between the pawl and lever members permitting the detents to engage the teeth of the ratchet wheel for rotation in a given direction. The surfaces 37 and 38 are radially spaced from the surfaces 36—36 approximately 90 degrees and consequently a half revolution of the connection 34 operates to reverse the direction of rotation.

The lower portion of the pawl 25 is provided with jaws 41—41 between which the shifter 33 is inserted and a two-piece supporting pintle 42 extends through the jaws and shifter and a securing rivet 43 extends through the shifter and pintle to cause the last named members to rotate in unison. The pintle 42 is preferably formed of two pieces each of semicircular section and outwardly of the pawl each section is deflected laterally and outwardly to form a jaw 45. The jaws 45 of the respective pintle sections are apertured at 46 to receive the trunnions 47 of a universal joint connector 48. The connector 48 includes a body portion lying between the trunnions 47—47 and apertured at 50 for making pivotal connection at 51 with the connection 34.

The connection 34 includes a pair of jaws 52—52 which straddle the body section of the connector 48 and connect therewith by means of pintle 51. The connection 34 is extended outwardly towards the side sill of the car and beyond said sill is formed with a handle portion 53. The connection 34 is weighted to bias the shifter to normal released position and such weighting is preferably carried out by offsetting an intermediate portion of the connection rod 34 as indicated at 54.

The offset 54 is positioned to hang in a vertical depending position when the shifter is in neutral position and is displaceable therefrom to a substantially horizontal position as indicated in Figs. 17 and 19 for effecting rotation of the take-up device in the selected direction. The angular movement of the shifter is limted by stops 55 which engage with abutments 56 on the pawl.

The operation of the device is simple as the operator merely turns the connection 34 in the selected direction and by a reciprocating movement of the said connection oscillates the lever assembly and by reason of the engagement between the pawl and teeth of the ratchet wheel effects rotation of the take-up device. Upon completion of the take-up movement, the weighted portion of the rod returns to the vertical position as indicated by conventional dot and dash lines in Figs. 17 and 19 and the device is thus automatically maintained in neutral released position.

What is claimed as new is:

1. In a slack adjuster for the brake system of a railway car including a take-up device operable by rotation for varying the relation between certain parts of the system and thereby compensate for excessive slack; a lever pivotally mounted on said rotatable take-up device and a pawl pivotally mounted on the lever for limited swinging motion relatively to the lever to engage with the rotatable take-up device and rotate in unison therewith in one direction and independently thereof in the opposite direction; and means for regulating the direction and extent of relative movement between the pawl and lever including abutments on the lever spaced from each other in the direction of swinging movement and a cam shifter pivotally mounted on an axis extending in the general direction of swinging movement, said shifter having its outer portion formed of varying depth and extending in the space between the abutments to change the relative relation between the lever and pawl upon rotation of the shifter.

2. In a slack adjuster for the brake system of a railway car including a take-up device operable by rotation; a lever pivotally mounted on said take-up device and a pawl pivotally mounted on the lever member for limited swinging motion relatively to the lever, said pawl having detents respectively disposed on the opposite sides of its pivotal axis to engage with the take-up device, said oppositely disposed detents of the pawl being spaced to normally lie in a neutral position outwardly of the take-up device and swingable to engage the latter and rotate therewith in either direction; and means for maintaining the pawl in neutral position and regulating the direction of rotation, said means including abutments on the lever spaced from each other in the direction of swinging movement and a screwlike shifter pivotally mounted on the pawl on an axis extending in the general direction of swinging movement, said shifter having its outer portion swingable between the abutments and formed of varying depth with a section substantially corresponding in depth to the space between the abutments to maintain the pawl in neutral position and said outer portion reducing in depth in opposite directions from said maximum depth to present axially spaced steps connected with the central section by inclined walls to change the direction of rotation by advancing or receding the pawl in relation to the lever members.

3. In a slack adjuster for the brake system of a railway car including a take-up device operable by rotation for varying the relation between certain parts of the system and thereby compensate for excessive slack; the herein described improved means for effecting rotation of the take-up device including a ratchet wheel secured to the take-up device, a lever pivotally mounted on the take-up device and a pawl pivoted to the lever and having limited swinging movement relatively thereto, said pawl having oppositely disposed detents, one of said detents being engageable with the ratchet wheel for rotation in one direction and the other detent being adapted to engage the ratchet wheel for rotation in the opposite direction; and co-operating means carried by the pawl and lever respectively for change in the direction of rotation, said means on the lever including abutments spaced from each other in the direction of swinging movement of the lever and said means carried by the pawl including a cam shifter pivotally mounted on the pawl and having its outer portion swingable between the abutments, said outer portion having stepped faces for advancing and retracting the pawl relatively to the lever to change the operation from one detent to the other and thereby alter the direction of rotation.

4. In a slack adjuster for the brake system of a railway car including a rotatable take-up device for varying the relation between certain parts of the brake system by rotation of said take-up device, means for rotating the said take-up device by reciprocatory movement including a ratchet wheel on the take-up device, a lever pivotally mounted on the take-up device and a pawl pivotally mounted on the lever, said pawl having oppositely disposed detents adapted to engage with the ratchet wheel for rotation of the take-up device, one of said detents operating to rotate the take-up device in one direction and the opposite detent operating to rotate in the opposite direction, said pawl being swingable relatively to the lever to move the detents in and out of engaging relation with the ratchet wheel; and means for regulating the extent and direction of relative movement including spaced abutments on the lever and a shifter having stepped faces engaging the abutments for advancing or receding the pawl in relation to the levers, said shifter being rotatably mounted on the pawl on an axis extending in the general direction of swinging movement of said pawl and rotatable to bring different stepped faces into engaging relation with the abutments.

5. In a slack adjuster for the brake system of a railway car including a rotatable take-up device for varying the relation between certain parts of the system by rotation of said take-up device, means for rotating said take-up device by reciprocatory movement including a lever rotatably mounted on the take-up device, and interengaging pawl and ratchet members carried by the lever and ratchet respectively, said pawl being swingable relatively to the lever and having oppositely disposed detents engageable with the ratchet wheel for rotation thereof in opposite directions; and means for regulating the extent and direction of relative movement between the pawl and lever including abutments on the lever spaced in the general direction of swinging movement of the pawl and a cam shifter rotatably mounted on an axis extending transversely of the axis of the take-up device and formed with stepped faces lying between the abutments whereby the relation between the lever and pawl is varied by rotation of the shifter, said shifter including a section of maximum depth having opposite faces spaced from each other a distance corresponding substantially to the distance between the abutments and other faces stepped axially from each other and connected to the section of maximum depth by inclined faces whereby rotation of the shifter operates as a wedge to advance or recede the pawl in relation to the lever and thereby reverse the direction of rotation, said shifter when positioned to dispose the section of maximum depth between the abutments operaing to lock the pawl against movement relative to the lever and thereby mainain the lever assembly in released neutral position.

6. In a slack adjuster for the brake system of a railway car including a take-up device operable by rotation for varying the relation between certain of the parts and thereby compensate for excessive slack; the herein described improved mechanism for rotating the take-up device by reciprocatory motion, including a ratchet wheel fixedly mounted on the take-up device; an oscillatable lever assembly pivotally mounted on the take-up device and including a lever and a pawl pivotally mounted on the lever and swingable thereon to engage with the ratchet wheel for rotation of the latter in either direction; a rod connected to the pawl for oscillating the assembly by a back and forth movement of the rod, said rod being rotatably mounted on the pawl; co-operating means between the pawl and oscillatable lever for varying the relation between said pawl and lever and regulating the extent and direction of said relative movement including spaced abutments on the lever and said means on the pawl including a cam shifter rotatable with the operating rod, and having its outer section extending between the abutments, said shifter including a section of maximum depth having opposite faces spaced from each other a distance corresponding substantially to the distance between the abutments and operating to maintain the pawl in a released neutral position, said shifter having stepped faces axially spaced from each other and connected with the section of maximum depth by inclined faces extending in opposite directions whereby upon rotation of the shifter a wedging action is exerted against the abutments to advance or recede the pawl in relation to the lever and thereby effect a change in the direction of rotation of the take-up device; and means for biasing the shifter to neutral position including an eccentrically mounted weight on the rod adapted to gravitate to a pendulate position.

7. In a slack adjuster for the brake system of a railway car including a take-up device operable by rotation for varying the relation between certain parts of the system and thereby compensating for excessive slack; the herein described improved mechanism for rotating the take-up device by reciprocatory movement, said mechanism including: a ratchet wheel on the take-up device, a lever pivotally mounted on the take-up device and a pawl pivotally mounted on the lever for limited swinging movement, said pawl having oppositely disposed detents for engagement with the ratchet wheel for rotation of the latter in opposite directions, and co-operating means between the lever and pawl for regulating the direction and extent of movement between the lever and pawl, said means on the lever including abutments spaced from each other in the general direction of swinging movement and said means carried by the pawl including a cam shifter pivotally mounted on an axis extending transversely of the axis of the take-up device, said shifter having its outer section swingable between the abutments and said outer section having stepped faces with connecting inclined faces whereby rotation of the shifter operates to vary the relation between the lever and pawl and effect a change in direction of rotation; and an operating rod extending outwardly from the shifter and rotatable therewith for fixing the direction of rotation and rotating the take-up device by reciprocatory movement of the rod.

No references cited.